(12) United States Patent
Alghusain et al.

(10) Patent No.: US 11,565,640 B2
(45) Date of Patent: Jan. 31, 2023

(54) SUPPORT BRACKET

(71) Applicant: KARMA AUTOMOTIVE LLC, Irvine, CA (US)

(72) Inventors: Rasha Alghusain, Irvine, CA (US); Philip McCarroll, Irvine, CA (US); Osamu Yamashita, Irvine, CA (US); Jerry Kuo, Irvine, CA (US); Bradley Moppins, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 16/704,818

(22) Filed: Dec. 5, 2019

(65) Prior Publication Data
US 2021/0170966 A1 Jun. 10, 2021

(51) Int. Cl.
*B60R 16/08* (2006.01)

(52) U.S. Cl.
CPC .................................. *B60R 16/08* (2013.01)

(58) Field of Classification Search
CPC ...................................................... B60R 16/08
USPC ......... 248/27.1, 205.1, 213.2, 220.21, 231.9, 248/314, 200, 65, 300, 301, 74.1, 74.2
See application file for complete search history.

(56) References Cited

U.S. PATENT DOCUMENTS

| 3,317,167 | A | * | 5/1967 | Becker | F16L 3/13 |
|---|---|---|---|---|---|
| | | | | | 248/73 |
| 3,423,058 | A | * | 1/1969 | Kuster | A47G 25/0607 |
| | | | | | 248/301 |
| 4,709,890 | A | * | 12/1987 | Moore | B63B 45/00 |
| | | | | | 248/205.1 |
| 5,230,495 | A | * | 7/1993 | Brackus | B60R 11/0241 |
| | | | | | 248/176.1 |
| 6,375,137 | B1 | * | 4/2002 | McQuade | A47B 96/061 |
| | | | | | 248/205.1 |
| 6,478,283 | B1 | * | 11/2002 | Figurel | B60T 7/10 |
| | | | | | 248/221.11 |
| 6,513,776 | B1 | * | 2/2003 | Bissett | B05B 13/02 |
| | | | | | 173/171 |
| 8,550,410 | B2 | * | 10/2013 | Fraser | B60R 11/02 |
| | | | | | 248/27.1 |

(Continued)

FOREIGN PATENT DOCUMENTS

| CN | 104723997 A | 6/2015 |
|---|---|---|
| CN | 105927796 A | 9/2016 |

(Continued)

OTHER PUBLICATIONS

International Search Report and Written Opinion dated Mar. 9, 2021 issued in related International Patent Application No. PCT/US2020/061919; filed Nov. 24, 2020.

*Primary Examiner* — Terrell L McKinnon
*Assistant Examiner* — Michael McDuffie
(74) *Attorney, Agent, or Firm* — Honigman LLP

(57) ABSTRACT

A bracket for a hose of a vehicle system. The bracket having a hook and a mounting segment. The hook allows free movement of the hose while cradling the hose to prevent the hose from rubbing against abrasive or high temperature surfaces. The mounting segment includes an anti-rotation segment which abuts a mounting point to prevent rotation of the bracket. The bracket also includes gussets which reinforce the bending resistance of the bracket.

16 Claims, 5 Drawing Sheets

(56) References Cited

U.S. PATENT DOCUMENTS

| | | | | | |
|---|---|---|---|---|---|
| 2002/0074473 | A1* | 6/2002 | Behar | .................... | G06F 1/1607 248/300 |
| 2005/0279892 | A1* | 12/2005 | Kovac | ..................... | F16L 3/127 248/65 |
| 2007/0158517 | A1* | 7/2007 | King | ..................... | A47F 5/0006 248/301 |
| 2010/0260573 | A1* | 10/2010 | Gardner | .................... | H02G 3/32 411/81 |
| 2012/0061106 | A1* | 3/2012 | McAllister | .............. | F16L 41/12 169/5 |
| 2018/0326933 | A1* | 11/2018 | Pahisson | ............. | B60R 16/0215 |

FOREIGN PATENT DOCUMENTS

| | | |
|---|---|---|
| JP | 07-276042 A | 10/1995 |
| WO | 2019-191233 A1 | 10/2019 |

\* cited by examiner

SUPPORT BRACKET

The present disclosure relates to a mounting bracket for a hose of a vehicle system.

A vehicle, such as an automobile, includes different fluid lines such as cooling lines, transmission lines, brake lines, air-conditioning lines each that may comprise hose(s).

The disclosed invention aids in supporting hoses located throughout the vehicle. A bracket is disposed on the underside of the vehicle to support a hose line. The bracket improves serviceability due to its simplicity and prevents wear to the hoses from contact with abrasive surfaces caused by vehicle movement and vibration or due to contact of the hose with high temperature surfaces.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

According to one disclosed embodiment, a bracket is provided for a vehicle in order to cradle a hose of a vehicle fluid system. The bracket may be fastened to any hard points on the vehicle frame, but the bracket may also be fastened to vehicle components such as the engine block or an electric vehicle battery platform.

Figure 1:
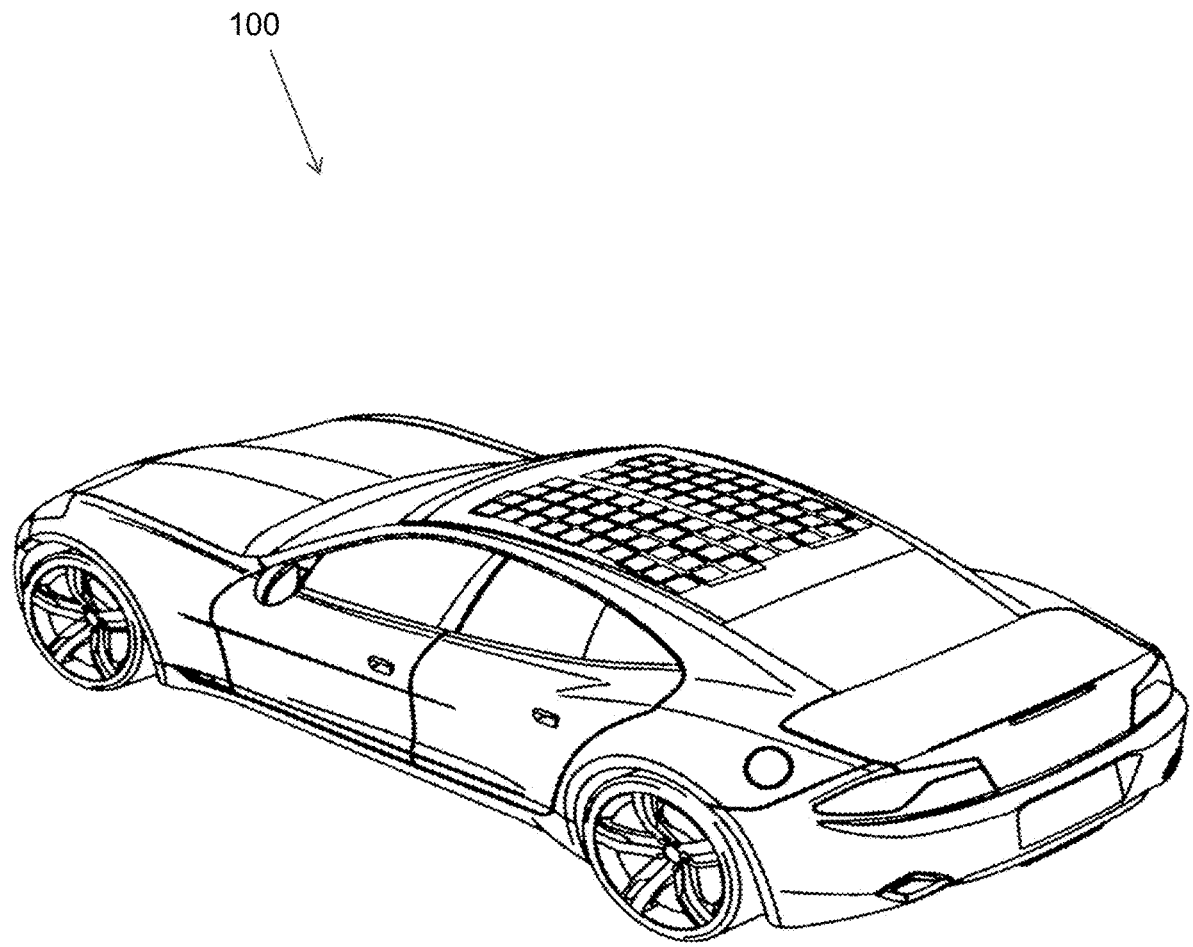
FIG. 1 is an isometric view of a vehicle with an exemplary bracket.
Figure 2:
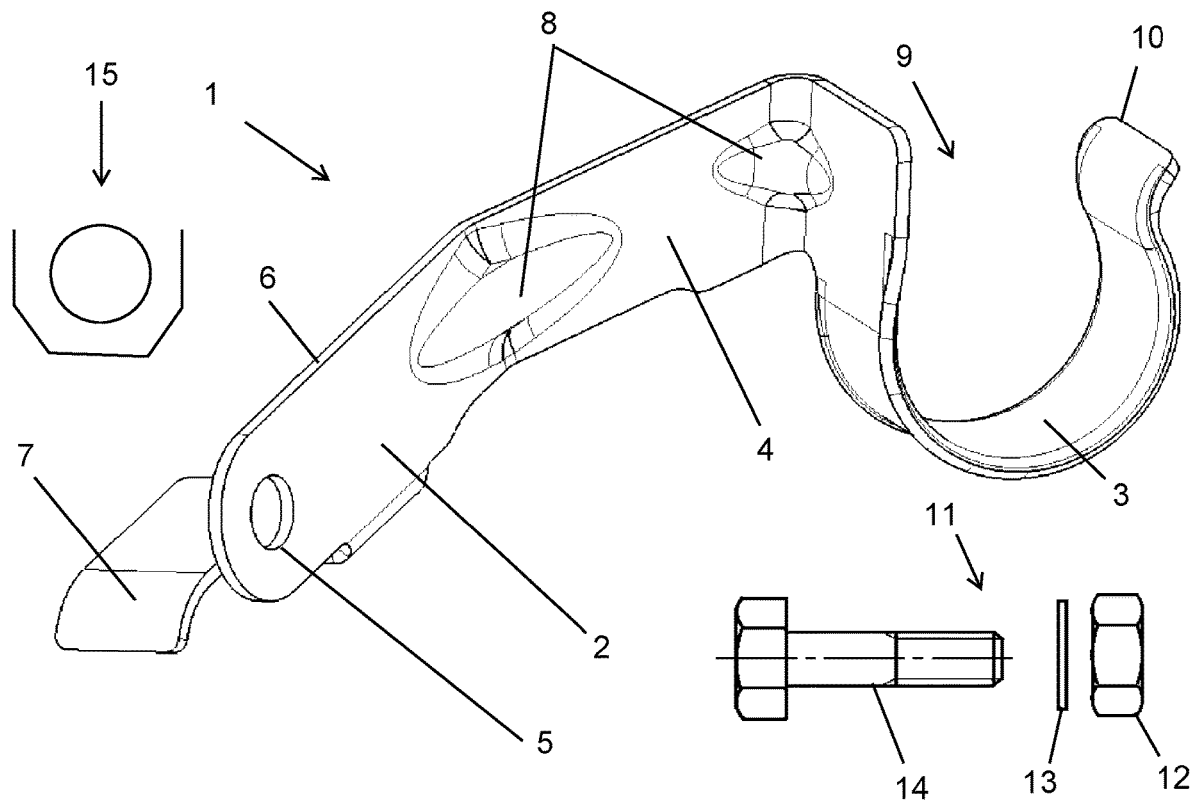
FIG. 2 is an isometric view of an exemplary bracket with a fastener.
Figure 3:
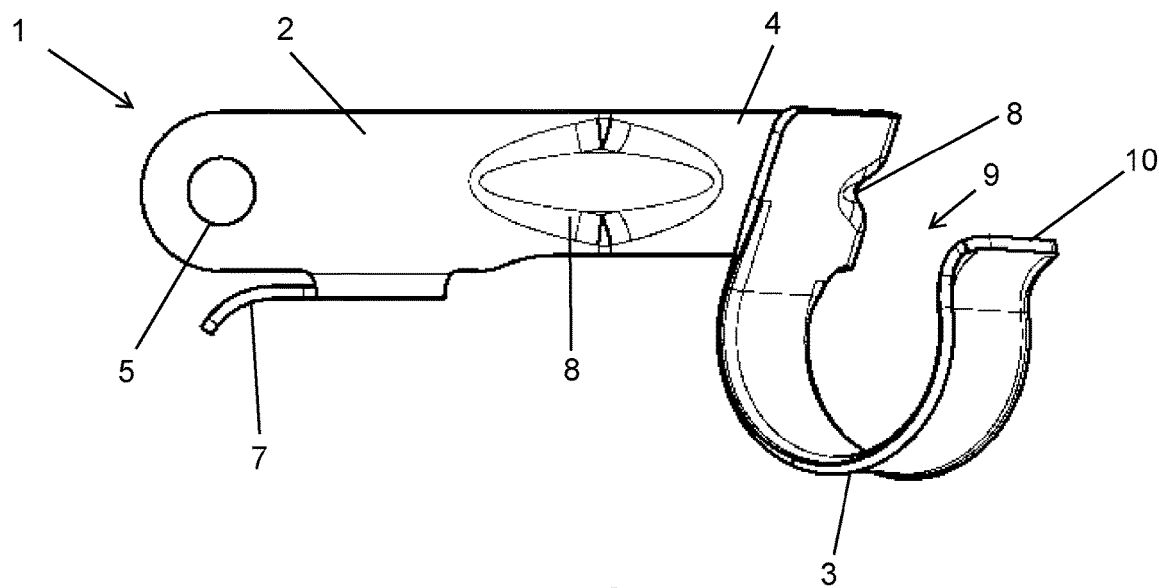
FIG. 3 is a front view of the bracket of FIG. 2.
Figure 4:
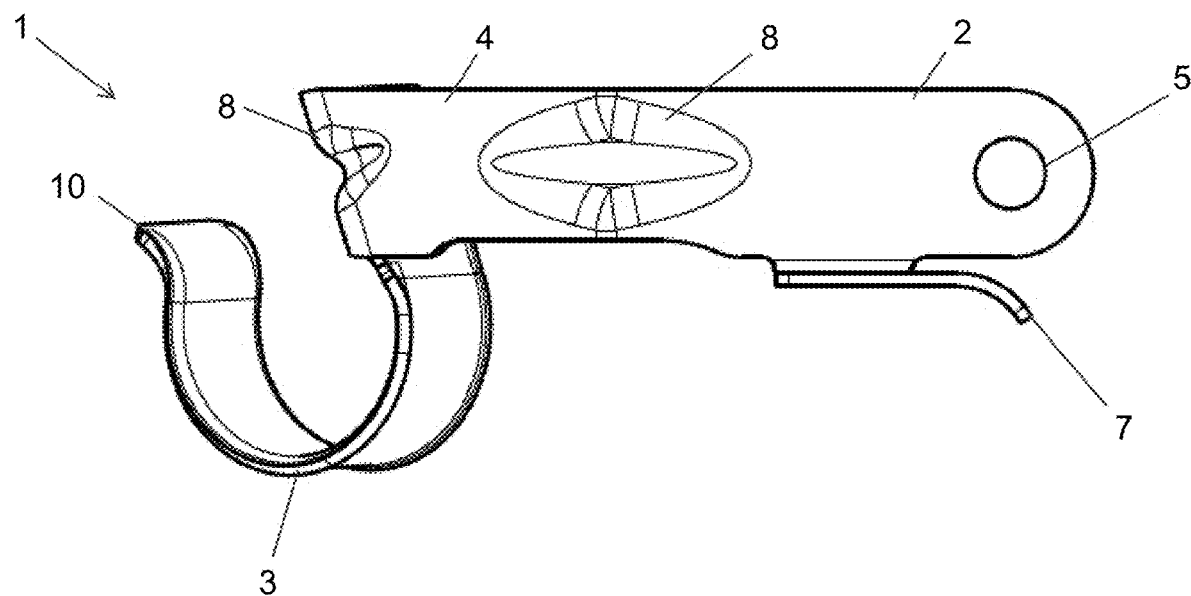
FIG. 4 is a rear view of the bracket of FIG. 2.
Figure 5:
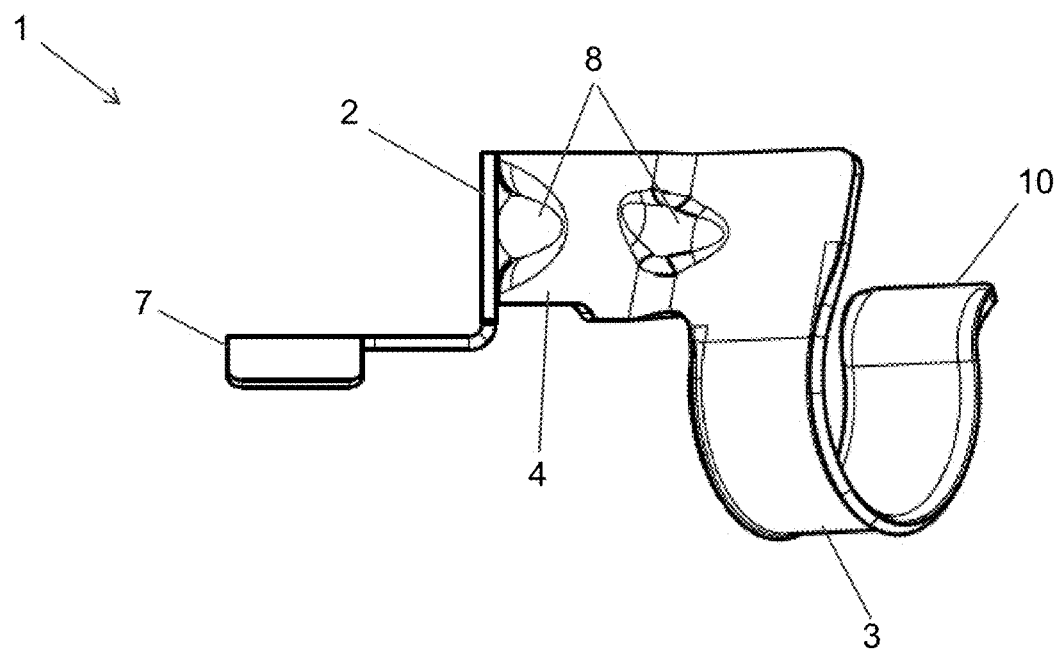
FIG. 5 is a side view of the bracket of FIG. 2.
Figure 6:
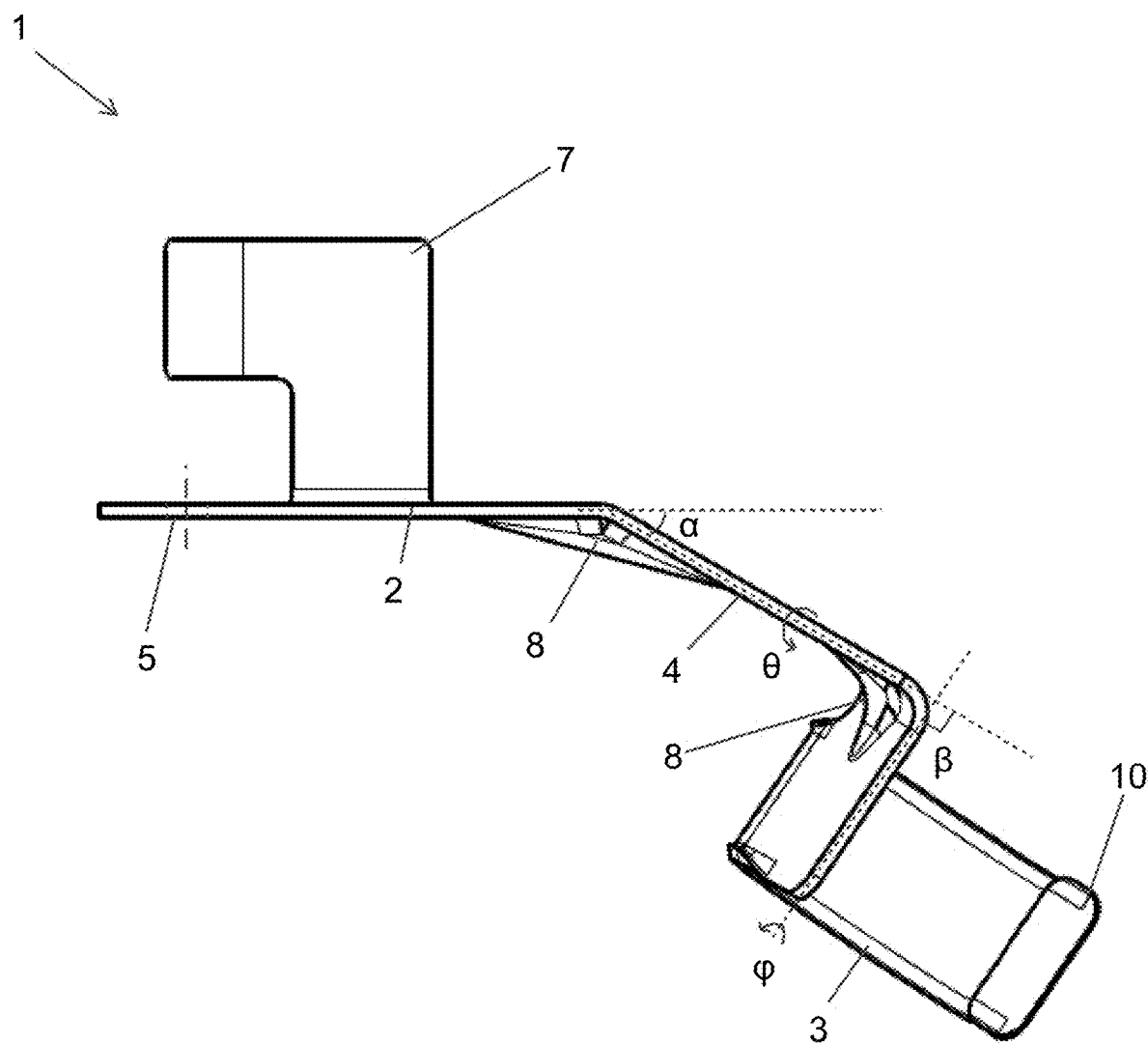
FIG. 6 is a top view of the bracket of FIG. 2.

FIG. 1 illustrates a vehicle 100 comprising a bracket (not shown) as further described below. The bracket may be located on different fastening points of the vehicle to cradle a hose of a fluid system of the vehicle.

FIGS. 2-6 illustrate different views of bracket 1 configured to cradle a hose (not shown). The bracket 1 may be a flat metal strip that is stamped into a desired configuration. The bracket includes a mounting segment 2 at one end, a hose supporting hook 3 at an opposite end and an intermediate segment 4 in between. Thus the intermediate segment 4 directly extends from the mounting segment 2, and the hook 3 directly extends from the intermediate segment 4. The intermediate segment 4 and hook 3 may extend at an angle. The mounting segment comprises a fastening aperture 5 which is configured to receive a fastening mechanism 11 comprising a nut 12, bolt 14, and washer 13. The hook 4 is configured to cradle a hose with a low friction fit and allows the hose to move freely longitudinally along the hose's length. The hook 3 of the bracket may be formed of a low friction material or include a low friction coating to allow the hose to move freely within the hook without causing abrasion damage. The hook 3 also isolates the hose from components that may damage the hose such as an abrasive surface of vehicle components, a high temperature surface or other hose lines of the vehicle system.

The hook 3 is also configured to allow movement of the hose resulting from vibrations of the vehicle, allowing the hose to vibrate freely independent of the bracket 1, and does not restrict the movement of the hose in the same manner as conventional hose clamp brackets. Additionally, the hook 3 may be formed as part of a stamping process used to form the entire bracket 1, this allows the hook surface to be smooth to prevent abrasion of the hose from rubbing. Furthermore, the hook 3 may comprise a semicircular shape and includes an opening 9 which the hose may be inserted into and a lip 10 which allows the hose to slip into the hook 3 easily. The hook 3 only partially clamps to the hose such that the hook portion cradles the hose and does not constrict its movement fully, allowing the hose to move and vibrate. This configuration allows for easier assembly and serviceability of the hose and the bracket 1.

The bracket 1 has a flat planar structure and has a relatively low or thin thickness 6 which allows the bracket to fit between close objects. The bracket eliminates interference between the hose and any other adjacent hose lines. The thin profile of bracket also allows the bracket 1 to be installed into pre-existing fasteners 11 on the vehicle. The bracket does not require special fasteners or tools in order to service the hose. For example, a mounting point 15 (e.g. an engine mount) of the vehicle may comprise the fastening mechanism 11 in which the bracket 1 may be inserted between the washer 13 and the mounting point 15. The mounting segment 2 may also include an anti-rotation segment 7 which extends from the mounting segment 2 adjacent to the fastening aperture 5. The anti-rotation segment 7 is configured to impede rotation of the bracket 1 by abutting against a static structure (e.g. mounting point 15) of the vehicle adjacent to the fastening hole 5. The anti-rotation segment 7 may be a separate bracket connected (e.g., by welding) the main portion of the bracket 1.

The bracket 1 may further include reinforcement gussets 8 which are disposed between the mounting segment 2 and the intermediate segment 4 and also the intermediate segment 4 and the hook portion 3. The gussets 8 are configured to reinforce the bracket to ensure rigidity. The gussets 8 may be formed on the bracket as a unitary structure to the bracket. The gussets 8 may also be a separate structure welded onto the bracket 1. The bracket may comprise of corrosion resistant metal or other materials that resist corrosion. The bracket 1 may be molded into a unitary piece, created by a tooling process (i.e. via a press brake), or additively manufactured. The angle at which the intermediate segment 4 and hook 3 bends relative to the mounting segment 2 and intermediate segment 4 respectively may be adjusted depending on the configuration of the vehicle in order for the bracket 1 to accommodate the space available in the vehicle system. For example, the angle $\alpha$ between the mounting segment 2 and intermediate segment 3 may be between 0 to 180 degrees. The angle $\beta$ between the hook 3 and the intermediate segment 3 may be between 0 to 180 degrees. As shown on FIG. 6, the angle $\alpha$ is shown as an acute angle of about 30° but may be any angle from 0 to ±180 degrees as measured from the center of the mounting segment 2 and center of the intermediate segment 4. Likewise, the angle $\beta$ is shown as an right angle but may be any angle from 0 to ±180 degrees as measured from center of the intermediate segment 4 and the end of the hook 3 at a hook portion directly connected to the intermediate segment 4. The intermediate segment 4 and hook 3 may also be rotated along its length at a twist angle at an angle $\theta$ and $\varphi$. This allows for the hook 1 to take any shape in order to hold the hose for the vehicle system.

Figure 7:
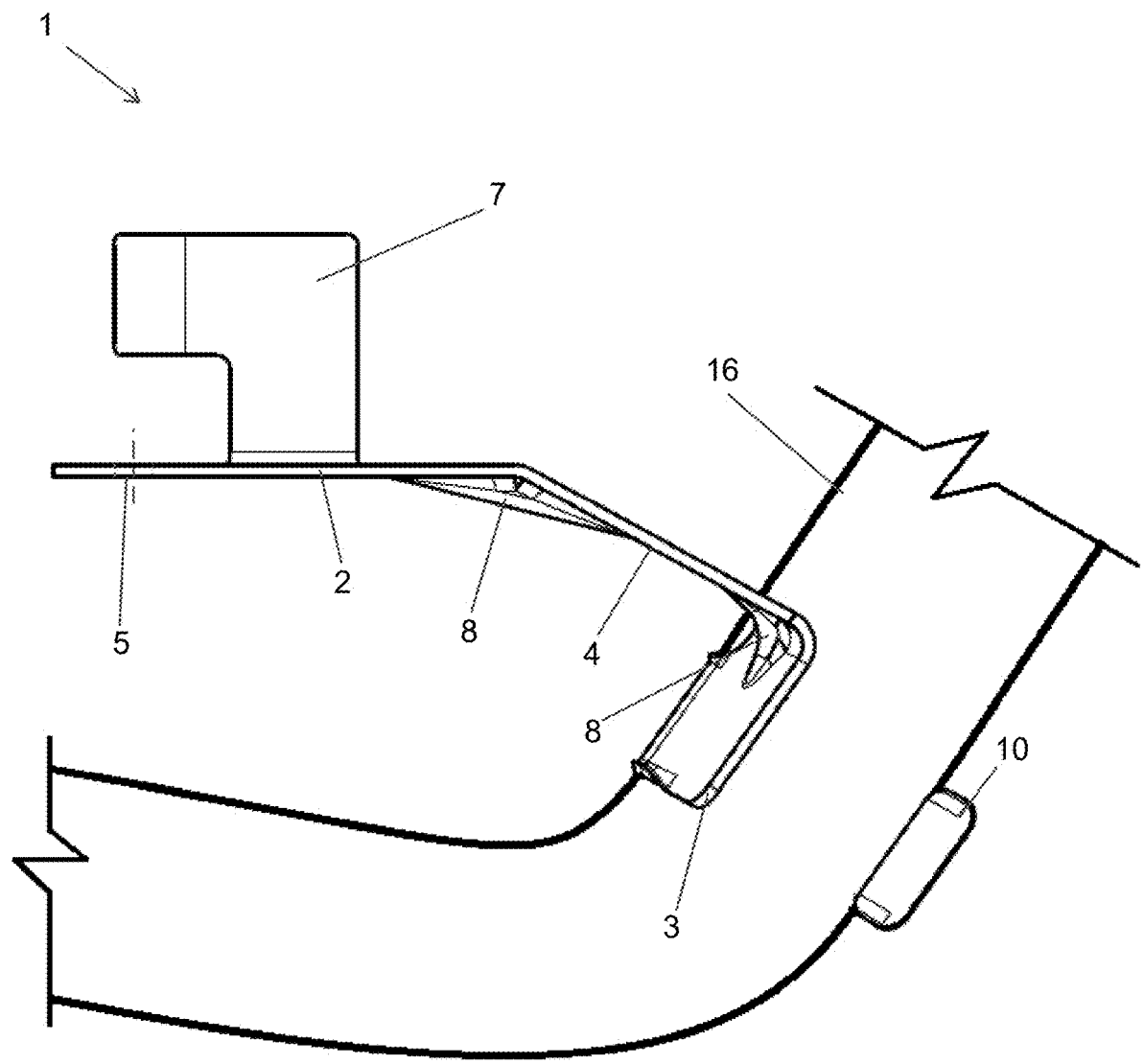
FIG. 7 is a top view of the bracket of FIG. 2 with a hose.

FIG. 7 shows the bracket 1 with a hose 16 cradled by the hook 3. The hose may be for different systems of the car such as battery systems, cooling lines, transmission lines, brake lines, HVAC lines, and exhaust systems. The hose may be located under the vehicle such as inside the engine compartment of the vehicle, under the passenger compartment, and any other locations located inside the outer frame of the vehicle that the hose is required.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the bracket as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A bracket configured to hold a hose of a vehicle, the bracket comprising:
    an intermediate segment;
    a mounting segment extending from one end of the intermediate segment, wherein the mounting segment includes a fastening aperture receiving a fastener configured to attach to a fastening point of the vehicle, the mounting segment defining a flat planar surface having a thickness and the fastening aperture is formed through the thickness of the flat planar surface of the mounting segment;
    a hook extending from another end the intermediate segment;
    wherein the hook is configured to cradle the hose such that the hose moves independently of the hook when the hose is clamped onto the hook; and
    an anti-rotation segment extending away from the mounting segment in a lateral direction substantially perpendicular to the flat planar surface of the mounting segment, wherein the anti-rotation segment abuts against the fastening point of the vehicle to impede rotation by the bracket when the fastening aperture of the mounting segment receives the fastener to attach to the fastening point of the vehicle.

2. The bracket of claim 1, wherein the bracket comprises at least one gusset configured to reinforce the bracket to resist bending.

3. The bracket of claim 2, wherein the at least one gusset is located between the intermediate segment and the mounting segment.

4. The bracket of claim 2, wherein the at least one gusset is located between the intermediate segment and the hook.

5. The bracket of claim 2, wherein the at least one gusset includes a first gusset located between the intermediate segment and the hook, and a second gusset located between the intermediate segment and the mounting segment.

6. A bracket configured to be fastened onto a vehicle mounting point by a fastener, the bracket comprising:
    an intermediate segment;
    a mounting segment extending from one end of the intermediate segment, wherein the mounting segment includes a fastening aperture receiving a fastener configured to attach to a fastening point of the vehicle, the mounting segment defining a flat planar surface having a thickness and the fastening aperture is formed through the thickness of the flat planar surface of the mounting segment;
    a hook extending from another end the intermediate segment; and
    an anti-rotation segment extending away from the mounting segment in a lateral direction substantially perpendicular to the flat planar surface of the mounting segment,
    wherein the hook is configured to cradle the hose such that the hose moves independently of the hook when the hose is clamped onto the hook, and wherein the mounting segment is placed between the mounting point and a washer of the fastener.

7. The bracket of claim 6, wherein the bracket comprises at least one gusset configured to reinforce the bracket to resist bending.

8. The bracket of claim 7, wherein the at least one gusset is located between the intermediate segment and the mounting segment.

9. The bracket of claim 7, wherein the at least one gusset is located between the intermediate segment and the hook.

10. The bracket of claim 7, wherein the at least one gusset includes a first gusset located between the intermediate segment and the hook, and a second gusset located between the intermediate segment and the mounting segment.

11. The bracket of claim 6, wherein the mounting segment abuts against the vehicle mounting point to prevent rotation of the bracket when the fastening aperture of the mounting segment receives the fastener to attach to the fastening point of the vehicle.

12. A bracket configured to clamp to a hose, the bracket comprising:
   an intermediate segment;
   a mounting segment extending from one end of the intermediate segment, wherein the mounting segment includes a fastening aperture receiving a fastener configured to attach to a fastening point of the vehicle, the mounting segment defining a flat planar surface having a thickness and the fastening aperture is formed through the thickness of the flat planar surface of the mounting segment;
   a hook extending from another end the intermediate segment; and
   an anti-rotation segment extending away from the mounting segment in a lateral direction substantially perpendicular to the flat planar surface of the mounting segment,
   wherein the hook is configured to cradle the hose such that the hose moves independently of the hook when the hose is clamped onto the hook, and wherein the hook allows longitudinal movement of the hose.

13. The bracket of claim 12, wherein the bracket comprises at least one gusset configured to reinforce the bracket to resist bending.

14. The bracket of claim 13, wherein the at least one gusset is located between the intermediate segment and the mounting segment.

15. The bracket of claim 13, wherein the at least one gusset is located between the intermediate segment and the hook.

16. The bracket of claim 13, wherein the at least one gusset includes a first gusset located between the intermediate segment and the hook, and a second gusset located between the intermediate segment and the mounting segment.

* * * * *